(12) United States Patent
Debie et al.

(10) Patent No.: US 12,158,448 B2
(45) Date of Patent: Dec. 3, 2024

(54) RADIATION SOURCE DEVICE

(71) Applicant: Infineon Technologies AG, Neubiberg (DE)

(72) Inventors: Derek Debie, Bogen (DE); Klaus Elian, Alteglofsheim (DE); Ludwig Heitzer, Falkenfels (DE); David Tumpold, Kirchheim beim München (DE); Jens Pohl, Bernhardswald (DE); Cyrus Ghahremani, Regensburg (DE); Thorsten Meyer, Regensburg (DE); Christian Geissler, Teugn (DE); Andreas Allmeier, Pfatter (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 18/050,178

(22) Filed: Oct. 27, 2022

(65) Prior Publication Data

US 2023/0194478 A1 Jun. 22, 2023

(30) Foreign Application Priority Data

Dec. 22, 2021 (EP) .................................. 21217025

(51) Int. Cl.
*G01N 29/22* (2006.01)
*G01N 25/00* (2006.01)
*G01N 29/02* (2006.01)
*G01N 29/24* (2006.01)

(52) U.S. Cl.
CPC ........... *G01N 29/222* (2013.01); *G01N 25/00* (2013.01); *G01N 29/02* (2013.01); *G01N 29/2425* (2013.01); *G01N 2291/021* (2013.01)

(58) Field of Classification Search
CPC .. G01N 29/222; G01N 29/02; G01N 29/2425; G01N 25/00; G01N 2291/021; G01N 2201/06186; G01N 21/1702; G01N 21/255; G01N 2021/1704
See application file for complete search history.

(56) References Cited

U.S. PATENT DOCUMENTS

| | | | |
|---|---|---|---|
| 9,513,261 B2 * | 12/2016 | Dehe | ................. G01N 29/2425 |
| 2019/0246459 A1 | 8/2019 | Tumpold et al. | |
| 2020/0253000 A1 | 8/2020 | Kautzsch et al. | |
| 2021/0172862 A1 | 6/2021 | Qi et al. | |
| 2021/0285866 A1 | 9/2021 | Kolb et al. | |

* cited by examiner

*Primary Examiner* — Suman K Nath
(74) *Attorney, Agent, or Firm* — Slater Matsil, LLP

(57) ABSTRACT

A radiation source device includes at least one membrane layer, a radiation source structure to emit electromagnetic or infrared radiation, a substrate and a spacer structure, wherein the substrate and the at least one membrane form a chamber, wherein a pressure in the chamber is lower than or equal to a pressure outside of the chamber, and wherein the radiation source structure is arranged between the at least one membrane layer and the substrate.

20 Claims, 10 Drawing Sheets

RADIATION SOURCE DEVICE

This application claims the benefit of European Patent Application No. 21217025, filed on Dec. 22, 2021, which application is hereby incorporated herein by reference.

TECHNICAL FIELD

Embodiments of the present disclosure relate to a radiation source device, for example, a radiation source device for emitting electromagnetic or infrared radiation, such as thermal radiation (infrared radiation). Further embodiments of the present disclosure relate to a PAS (PAS=photoacoustic spectroscopy) gas sensor comprising a radiation source device. Further embodiments relate to a low power PAS heater.

BACKGROUND

The detection of environmental parameters such as noise, sound, temperature or gases, is becoming more and more important for diverse application areas, such as mobile terminals, domestic automation systems and the automotive sector. Gas sensors, in particular, are playing an ever more important part in order to detect, for example, harmful gas concentrations on account of air contamination, pollution or critical events. Thus, the gas detection in the environment by inexpensive, always available and connected sensors is an upcoming topic in the future.

In the field of monitoring the air quality in the environment, there are several types of gas-sensing concepts, for example, the non-dispersive infrared (NDIR) sensors and photo-acoustical sensors (PAS=photoacoustic spectroscopy). Sensor are often based on the effect of an excitation of gas molecules in a medium by infrared light with a certain wavelength. A typical PAS sensor comprises a radiation source, such as a thermal emitter, filter elements for a wavelength selection, a detector and the sample area, where the light between the radiation source and the detector interacts with the environmental gas.

However, currently available radiation sources, such as electromagnetic radiation sources or infrared radiations sources (e.g., thermal emitters) used, for example, for PAS sensors cause high manufacturing costs and have a poor thermal radiation output. Specifically, a PAS sensor (e.g., CO2 sensor), which can measure a gas (e.g., CO2) content of the environment by means of a radiation source (e.g., PAS sensor), is currently realized as package in a package. Thereby, the radiation source is located in a hermetically sealed package, which in turn is located in a package of the measuring volume. The package of the radiation source (e.g., PAS emitter) including a Bragg filter as optical filter is expensive to manufacture and the package is known to have problems with respect to the hermetic seal. In addition, the radiation (e.g., electromagnetic or infrared radiation) output/yield is low.

Therefore, there is a need in the field of gas sensors for an approach of a radiation source that causes less manufacturing costs and has an improved radiation output.

Such a need can be solved by a radiation source according to independent claim 1.

Specific implementations of the radiation source are defined in the dependent claims.

SUMMARY

According to an embodiment, a radiation source device (e.g., electromagnetic radiation source device or infrared radiation source device, such as a thermal emitter device) comprises at least one membrane layer, a radiation source structure configured to emit electromagnetic or infrared radiation, a substrate, and a spacer structure arranged between the substrate and the membrane layer, wherein the substrate, the at least one membrane layer and the spacer structure form a chamber, wherein a pressure in the chamber is lower than or equal to a pressure outside of the chamber, wherein the radiation source structure is arranged between the at least one membrane layer and the substrate.

According to an embodiment, a gas sensor (e.g., photoacoustic spectroscopy gas sensor or non-dispersive infrared, NDIR, gas sensor) comprises a radiation source device for emitting electromagnetic or infrared radiation; a measurement volume having a target gas and providing an optical interaction path for the electromagnetic of infrared radiation emitted by the radiation source device; and an acoustic transducer or a direct thermal detector for providing a detector output signal based on the optical interaction of the emitted electromagnetic or infrared radiation with the target gas in the measurement volume, wherein the radiation source device comprises at least one membrane layer, a radiation source structure configured to emit electromagnetic or infrared radiation, a substrate, and a spacer structure arranged between the substrate and the membrane layer, wherein the substrate, the at least one membrane layer and the spacer structure form a chamber, wherein a pressure in the chamber is lower than or equal to a pressure outside of the chamber, wherein the radiation source structure is arranged between the at least one membrane layer and the substrate.

BRIEF DESCRIPTION OF THE DRAWINGS

Embodiments are described herein making reference to the appended drawings.

Figure 1:
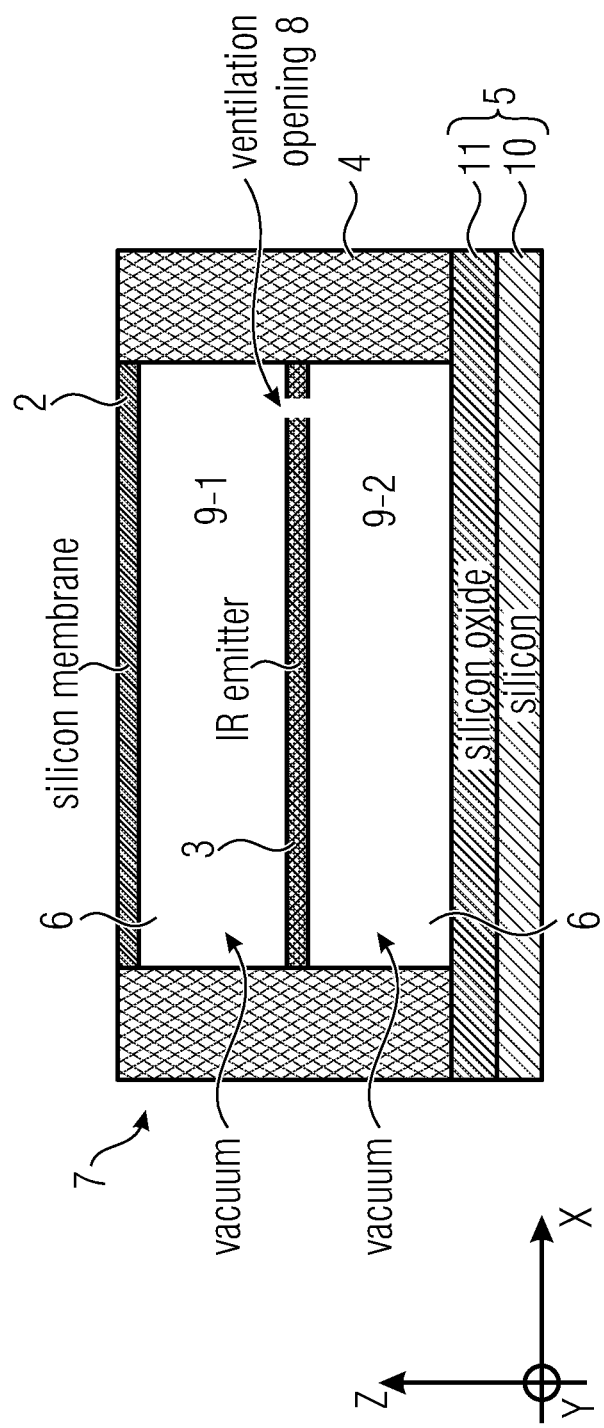
FIG. 1 shows a schematic cross-sectional view of a radiation source device having a silicon substrate, according to an embodiment.

Before discussing the present embodiments in further detail using the drawings, it is pointed out that in the figures and the specification identical elements and elements having the same functionality and/or the same technical or physical effect are usually provided with the same reference numbers or are identified with the same name, so that the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of radiation sources. The specific embodiments discussed are merely illustrative of specific ways to implement and use the present concept, and do not limit the scope of the embodiments. In the following description of embodiments, the same or similar elements or elements that have the same functionality are provided with the same reference sign or are identified with the same name, and a repeated description of elements provided with the same reference number or being identified with the same name is typically omitted. In the following description, a plurality of details is set forth to provide a more thorough explanation of embodiments of the disclosure.

However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction, i.e. parallel to the x-y-plane, wherein the term "vertical" means a direction parallel to the z-direction.

In the following description, a thickness of an element usually indicates a vertical dimension of such an element. In the figures, the different elements are not necessarily drawn to scale. Thus, the thicknesses of certain elements, for example thicknesses of the freestanding membrane, the semiconductor substrate, the insulating layer, the heavily doped semiconductor layer and/or the disc-shaped heat spreader structure may not be drawn to scale.

FIG. 1 shows a schematic cross sectional view of a radiation source device 1 according to an embodiment. The radiation source device can be, for example, an electromagnetic radiation source device or an infrared radiation source device, such as a thermal emitter device. For example, the device shown in FIG. 1 could be a low power emitter heater. In FIG. 1, the drawing plane is essentially parallel to the x-z-plane, such that the different layers extend essentially parallel to the x-y-plane.

The radiation source device 1 comprises a membrane layer 2, a radiation source structure 3 configured to emit electromagnetic or infrared radiation, a spacer structure 4 and a substrate 5, wherein the membrane layer 2, the spacer structure 4 and the substrate 5 form a chamber 6, wherein a pressure in the chamber 6 is lower than or equal to a pressure outside 7 of the chamber 6, and wherein the radiation source structure 3 is arranged between the membrane layer 2 and the substrate 5.

As shown in FIG. 1, according to an embodiment, the substrate 5 can be a substrate layer stack comprising a semiconductor layer 10 and an oxide layer 11 arranged on the semiconductor layer 10, such that the silicon oxide layer 11 is arranged between the spacer structure 4 and the silicon layer 10.

According to an embodiment, the electromagnetic or infrared radiation emitted by the radiation source structure 3 can be thermal radiation.

According to an embodiment, the radiation source structure 3 can be a thermal emitter structure.

According to an embodiment, the membrane layer 2 can be at least partially permeable for the electromagnetic or infrared radiation.

According to an embodiment, the chamber 6 formed by the membrane layer 2, the spacer structure 4 and the substrate 5 can be gas-tight.

According to an embodiment, the pressure in the chamber 6 is less than 300 mbar, such as, for example, vacuum.

According to an embodiment, the spacer structure 4 can comprise an electrically non-conductive material.

For example, the spacer structure 4 can comprise or consist of at least one out of silicon-oxide, silicon-nitride, glass and ceramic.

According to an embodiment, the radiation source structure 3 can be freestanding in the chamber 6 and laterally supported by the spacer structure 4. For example, the radiation source structure 3, or more precisely, a radiation source substrate of the radiation source structure 3, can be laterally attached to the spacer structure 4.

According to an embodiment, the radiation source structure 3 can comprise a perforation 8 forming a ventilation hole between a first volume portion 9-1 of the chamber 6 enclosed between the radiation source structure 3 and the membrane layer 2 and a second volume portion 9-2 of the chamber 6 enclosed between the radiation source structure 3 and the substrate 5.

According to an embodiment, the radiation source device 1 of FIG. 1 can be a vacuum infrared emitter on silicon.

Figure 2:
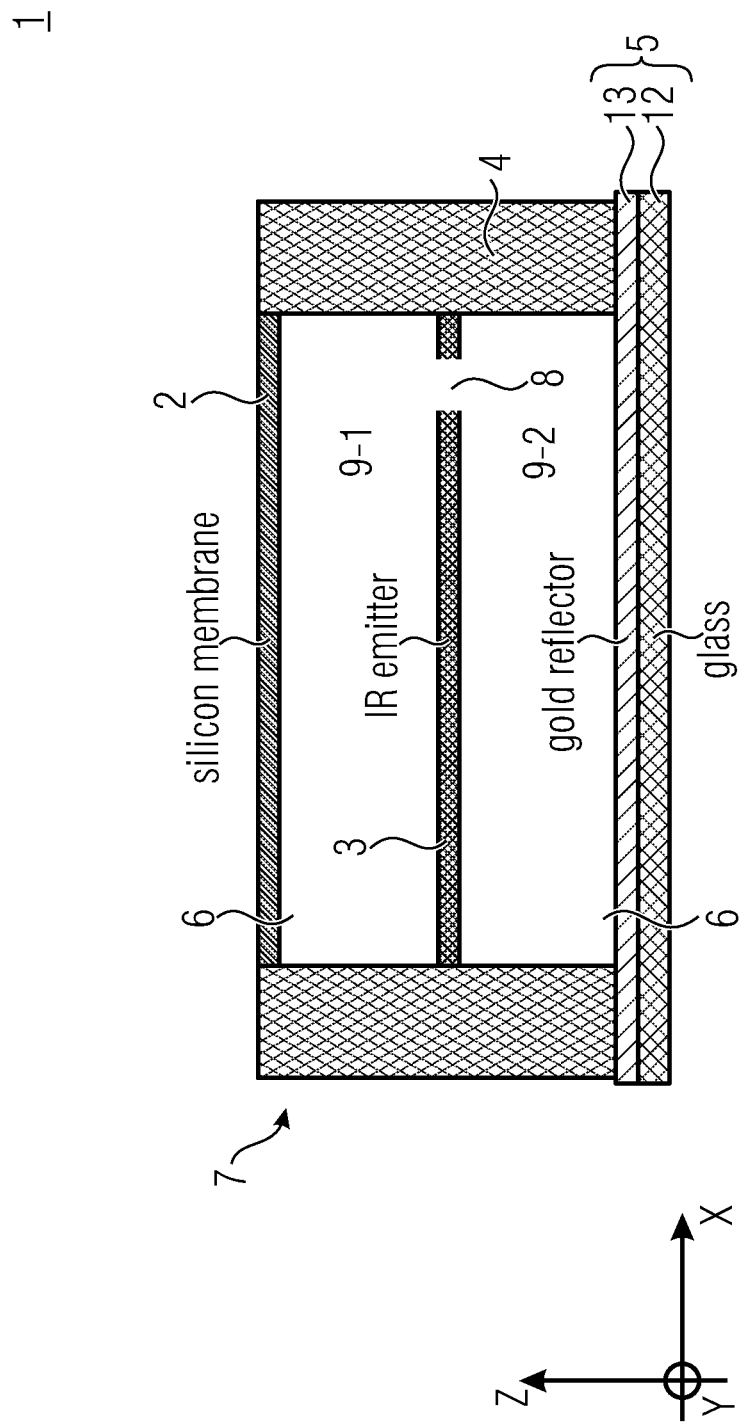
FIG. 2 shows a schematic cross-sectional view of a radiation source device having a glass substrate and a reflector for improving emitter output, according to an embodiment.

FIG. 2 shows a schematic cross sectional view of a radiation source device 1 according to an embodiment. In FIG. 2, the drawing plane is essentially parallel to the x-z-plane, such that the different layers extend essentially parallel to the x-y-plane.

In contrast to the radiation source device 1 of FIG. 1, the substrate 5 of the radiation source device 1 of FIG. 2 comprises a glass layer 12 and a reflector layer 13. Thereby, the reflector layer 13 can be arranged on the glass layer 12, such that the reflector layer 13 is arranged between the spacer structure 4 and the glass layer 12.

According to an embodiment, the reflector layer 13 can be configured to reflect electromagnetic radiation that is emitted by the radiation source structure 3 in direction of the reflector layer 13 (e.g., −z-direction) towards the membrane layer 2 (e.g., z-direction). Thereby, the electromagnetic radiation output (e.g., thermal radiation output) of the radiation source device 1 can be improved.

According to an embodiment, the reflector layer 13 can comprise or consist of gold. Alternatively, the reflector layer 13 also can comprise or consist of aluminum or silver.

According to an embodiment, the radiation source device 1 of FIG. 2 can be a vacuum infrared emitter on glass.

Figure 3:
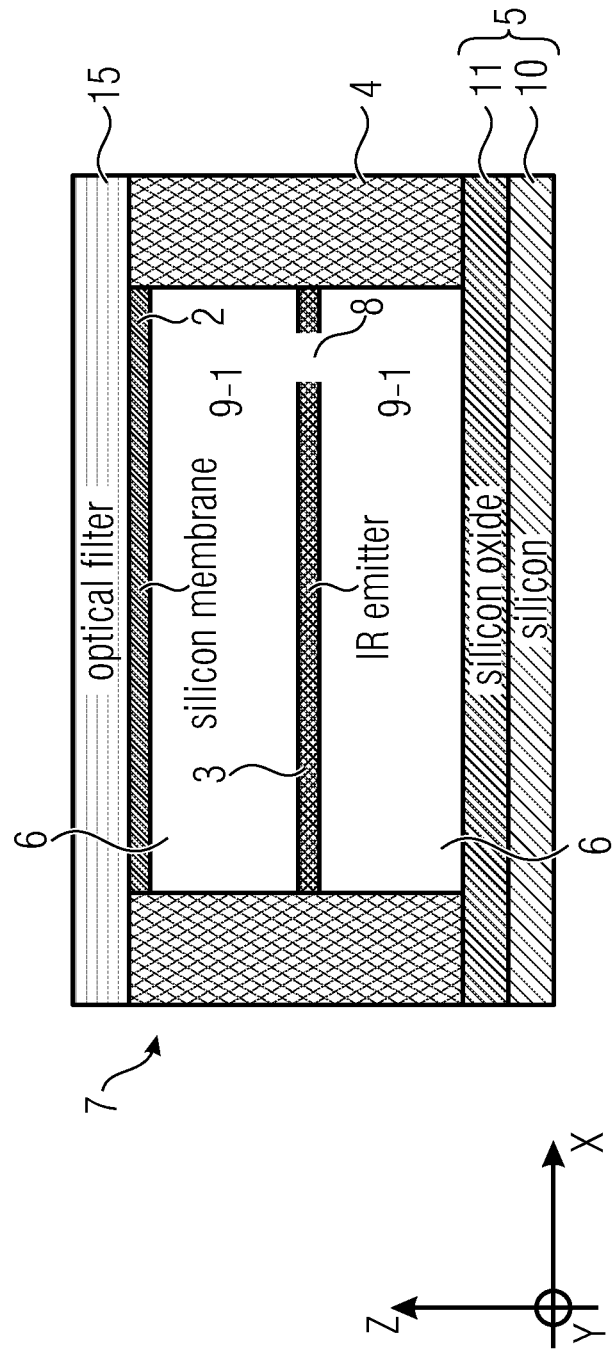
FIG. 3 shows a schematic cross-sectional view of a radiation source device having a silicon substrate and an optical filter, according to an embodiment.

FIG. 3 shows a schematic cross sectional view of a radiation source device 1 according to an embodiment. In FIG. 3, the drawing plane is essentially parallel to the x-z-plane, such that the different layers extend essentially parallel to the x-y-plane.

In contrast to the radiation source device 1 of FIG. 1, the radiation source device 1 of FIG. 3 additionally comprises an optical filter layer 15 arranged on the membrane layer 2.

According to an embodiment, the optical filter layer 15 can be a Bragg filter.

According to an embodiment, the optical filter layer 15 can be an optical wavelength selective filter.

For example, the optical wavelength selective filter can be adapted to select the wavelength range (e.g., IR, visual, etc.) for the desired application (e.g., CO2, or any other gas of interest).

According to an embodiment, the radiation source device 1 of FIG. 3 can be a vacuum infrared emitter on silicon with an optical filter.

Figure 4:
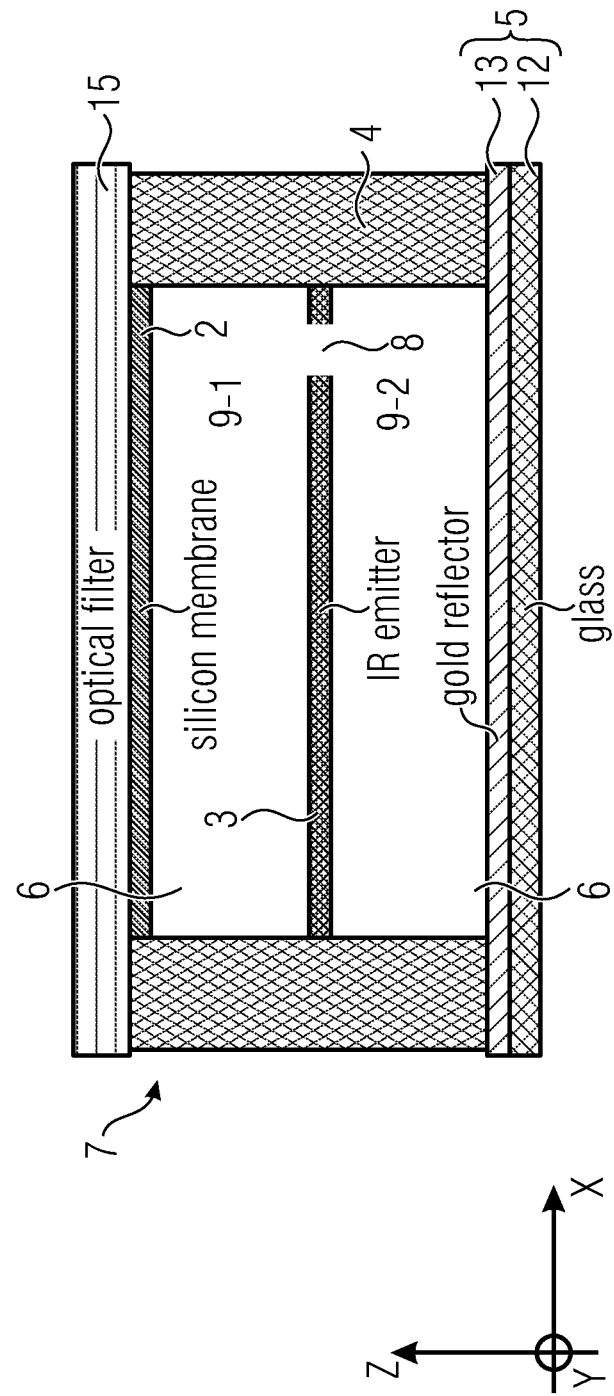
FIG. 4 shows a schematic cross-sectional view of a radiation source device having a glass substrate, an optical filter and a reflector for improving emitter output, according to an embodiment.

FIG. 4 shows a schematic cross sectional view of a radiation source device 1 according to an embodiment. In FIG. 4, the drawing plane is essentially parallel to the x-z-plane, such that the different layers extend essentially parallel to the x-y-plane.

In contrast to the radiation source device 1 of FIG. 2, the radiation source device 1 of FIG. 4 additionally comprises an optical filter layer 15 arranged on the membrane layer 2.

According to an embodiment, the optical filter layer 15 can be a Bragg filter.

According to an embodiment, the optical filter layer 15 can be an optical wavelength selective filter.

For example, the optical wavelength selective filter can be adapted to select the wavelength range (e.g., IR, visual, etc.) for the desired application (e.g., CO2, or any other gas of interest).

According to an embodiment, the radiation source device 1 of FIG. 4 can be a vacuum infrared emitter on glass with an optical filter and a reflector for improving the infrared output.

Figure 5:
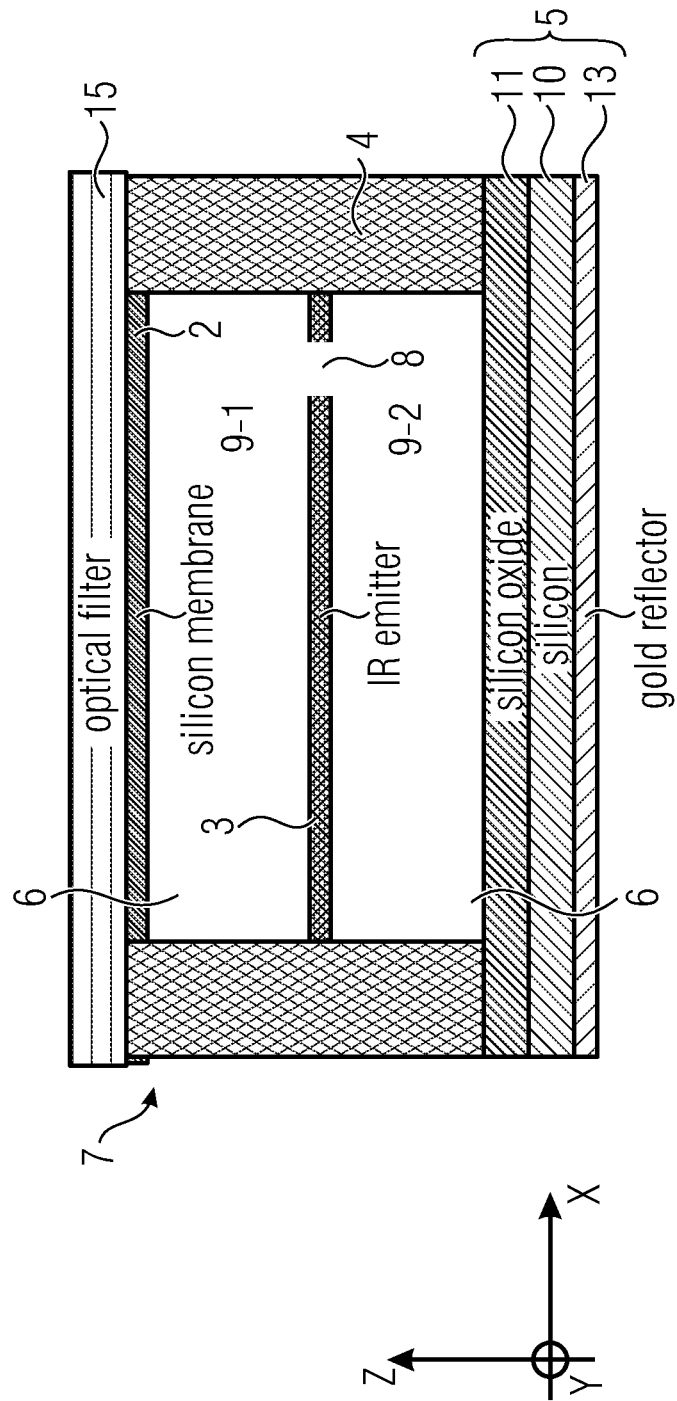
FIG. 5 shows a schematic cross-sectional view of a radiation source device having a silicon substrate, an optical filter and a reflector for improving the emitter output, according to an embodiment.

FIG. 5 shows a schematic cross sectional view of a radiation source device 1 according to an embodiment. In FIG. 5, the drawing plane is essentially parallel to the x-z-plane, such that the different layers extend essentially parallel to the x-y-plane.

In contrast to the radiation source device 1 of FIG. 1 or FIG. 3, the substrate 5 additionally comprises a reflector layer 13. The reflector layer 13 can be arranged under the silicon layer 10, or in other words, the silicon layer 10 can be arranged on the reflector layer 13.

According to an embodiment, the reflector layer 13 can be configured to reflect electromagnetic radiation that is emitted by the radiation source structure 3 in direction of the reflector layer 13 (e.g., −z-direction) towards the membrane layer 2 (e.g., z-direction). Thereby, the electromagnetic radiation output (e.g., thermal radiation output) of the radiation source device 1 can be improved.

According to an embodiment, the reflector layer 13 can comprise or consist of gold. Alternatively, the reflector layer 13 also can comprise or consist of aluminum or silver.

According to an embodiment, the radiation source device 1 of FIG. 5 can be a vacuum infrared emitter on silicon with an optical filter and a reflector for improving the infrared output.

Figure 6:
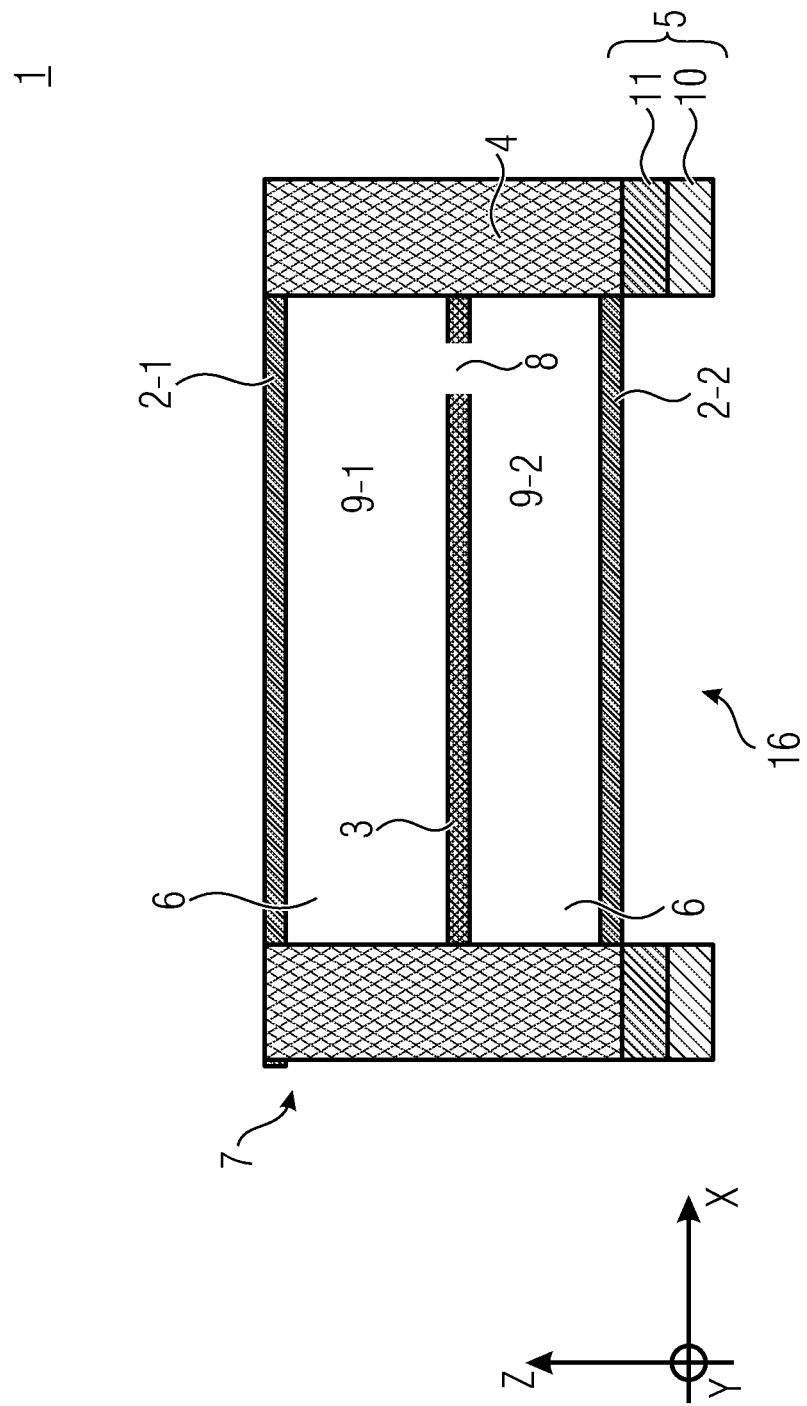
FIG. 6 shows a schematic cross-sectional view of a radiation source device according to an embodiment having two membrane layers.

FIG. 6 shows a schematic cross sectional view of a radiation source device 1 according to an embodiment. In FIG. 6, the drawing plane is essentially parallel to the x-z-plane, such that the different layers extend essentially parallel to the x-y-plane.

Compared to the radiation source device 1 of FIG. 1, the radiation source device 1 of FIG. 6 comprises two membrane layers 2-1 and 2-2, wherein the radiation source structure 3 is arranged between the two membrane layers 2-1 and 2-2.

Specifically, the radiation source device 1 comprises a first membrane layer 2-1, a radiation source structure 3 configured to emit electromagnetic or infrared radiation, a spacer structure 4 and a second membrane layer 2-2, wherein the first membrane layer 2-1, the spacer structure 4 and the second membrane layer 2-2 form a chamber 6, wherein a pressure in the chamber 6 is lower than or equal to a pressure outside 7 of the chamber 6, and wherein the radiation source structure 3 is arranged between the first membrane layer 2-1 and the second membrane layer 2-2. The radiation source device 1 can further comprise a substrate 5, e.g., comprising a silicon layer 10 and a silicon oxide layer 11, wherein the spacer structure 4 is arranged on the substrate 5. Thereby, the substrate 5 can comprise an opening 16 in an area adjacent to the second membrane layer 2.

Figure 7:
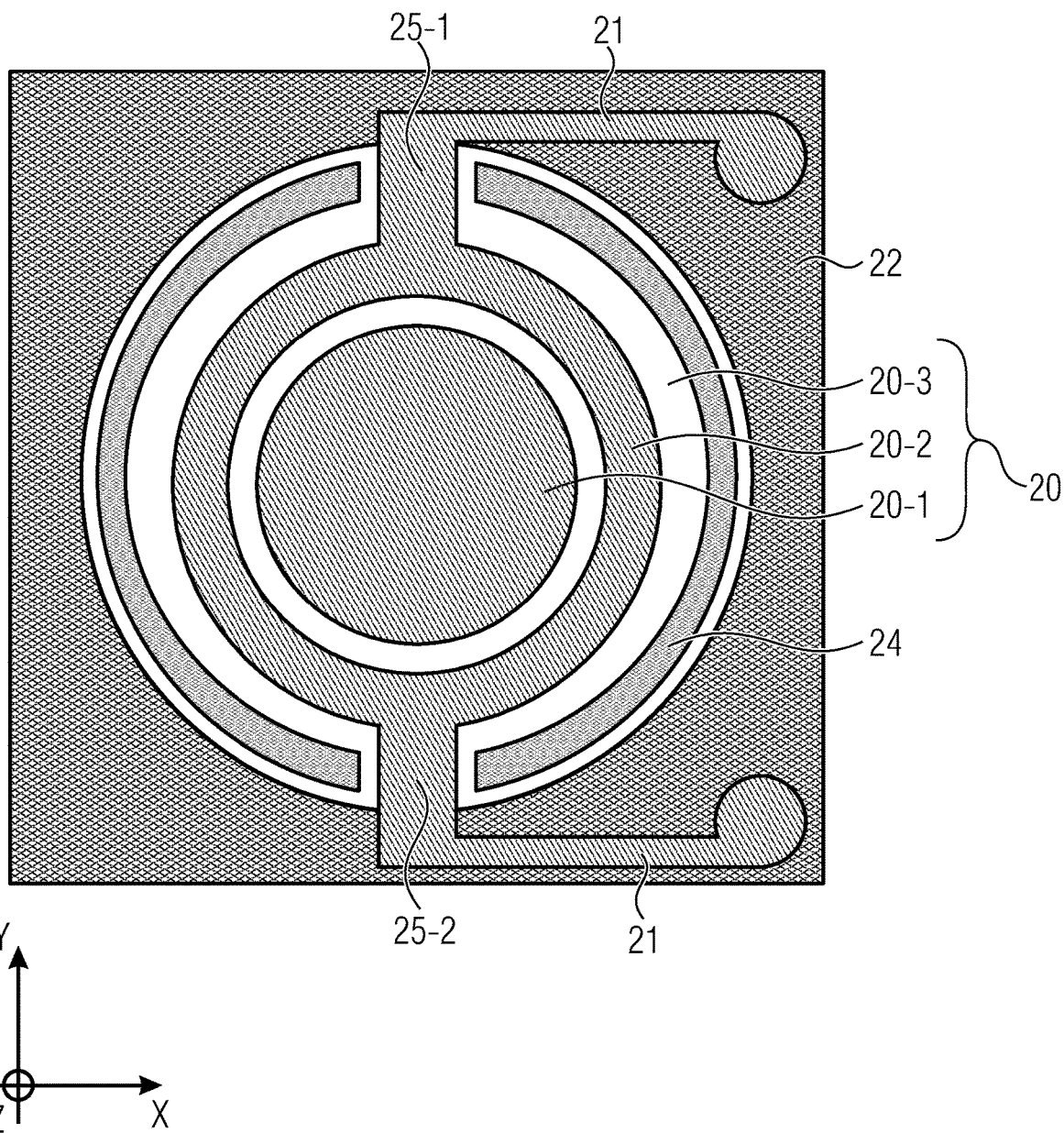
FIG. 7 shows a schematic top view of an exemplary radiation source structure.

FIG. 7 shows a schematic top view of a radiation source structure (e.g., thermal emitter structure) 3 according to an embodiment. In FIG. 7, the drawing plane is essentially parallel to the x-y-plane. The radiation source structure 3 comprises a freestanding radiation source membrane 20 supported by a radiation source substrate 22.

As shown in FIG. 7, the freestanding radiation source membrane (e.g., thermal emitter membrane) 20 comprises in a lateral extension a center section 20-1, a conductive (=electrically conductive) intermediate section 20-2 and a border section 20-3, wherein the conductive intermediate section 20-2 laterally surrounds the center section 20-1 and is electrically isolated from the center section 20-1. The conductive intermediate section 20-2 comprises a conductive (=electrically conductive) semiconductor material that is encapsulated in an insulating material. The border section 20-3 at least partially surrounds the intermediate section 20-2 and is electrically isolated from the conductive intermediate section 20-2, wherein a perforation 24 is formed through the border section 20-3.

In other words, the free standing radiation source membrane 20 supported by the radiation source substrate 22 may be segmented (=partitioned) into three sections, the (inner) center section 20-1, the conductive intermediate section 20-2 and the (outer) border section 20-3, which, for example, are supported by a radiation source substrate 22. The border section 20-3 may be mechanically bonded to the radiation source substrate 22.

According to an embodiment, the perforation 44 in the border region 20-3 forms a ventilation hole or a plurality of ventilation holes in the freestanding membrane 20. The perforation 24 forms a ventilation path through the border section 20-3. The ventilation hole(s) of the perforation 24 allows a gas ventilation between the environmental atmospheres at both sides of the freestanding radiation source membrane 20. Thus, an atmospheric pressure difference between the environmental atmospheres at both sides of the freestanding radiation source membrane 20 can be leveled out or balanced.

According to an embodiment, the conductive intermediate section 20-2 forms a branched current path separated by the center section 20-1. As exemplarily shown in FIG. 7, the conductive intermediate section 20-2 may form a clamping-area-shaped or ring-shaped element, that produces during an activated state (=electrical energization of the intermediate section 20-2) heat that may also spread into/through the center section 20-1. Thus, the center section 20-1 and the intermediate section 20-2 may together form a resulting heating structure or heating element for emitting or dissipating heat in form of thermal (e.g., infrared) radiation. Thus, the heated ring-shaped conductive intermediate section 20-2 may provide for a relatively uniform temperature profile in the heating structure.

According to an embodiment, the conductive intermediate section 20-2 of the freestanding membrane extends between at least two edge regions 25-1, 25-2 of the freestanding radiation source membrane 20. As shown in FIG. 7, the laterally opposing edge regions 25-1, 25-2 may traverse or bridge the border section 20-3 to reach a respective wiring structure or contact pad 21. The wiring structure 21 may be arranged to provide a bonding area for an external electrical connection, e.g., by means of bond wires, to a control and/or supply unit. The wiring structure 21 may comprise a copper, aluminum, tungsten, gold, platinum and/or titanium material or a layered stack of at least two of these materials for providing a low contact resistance.

Figure 8:
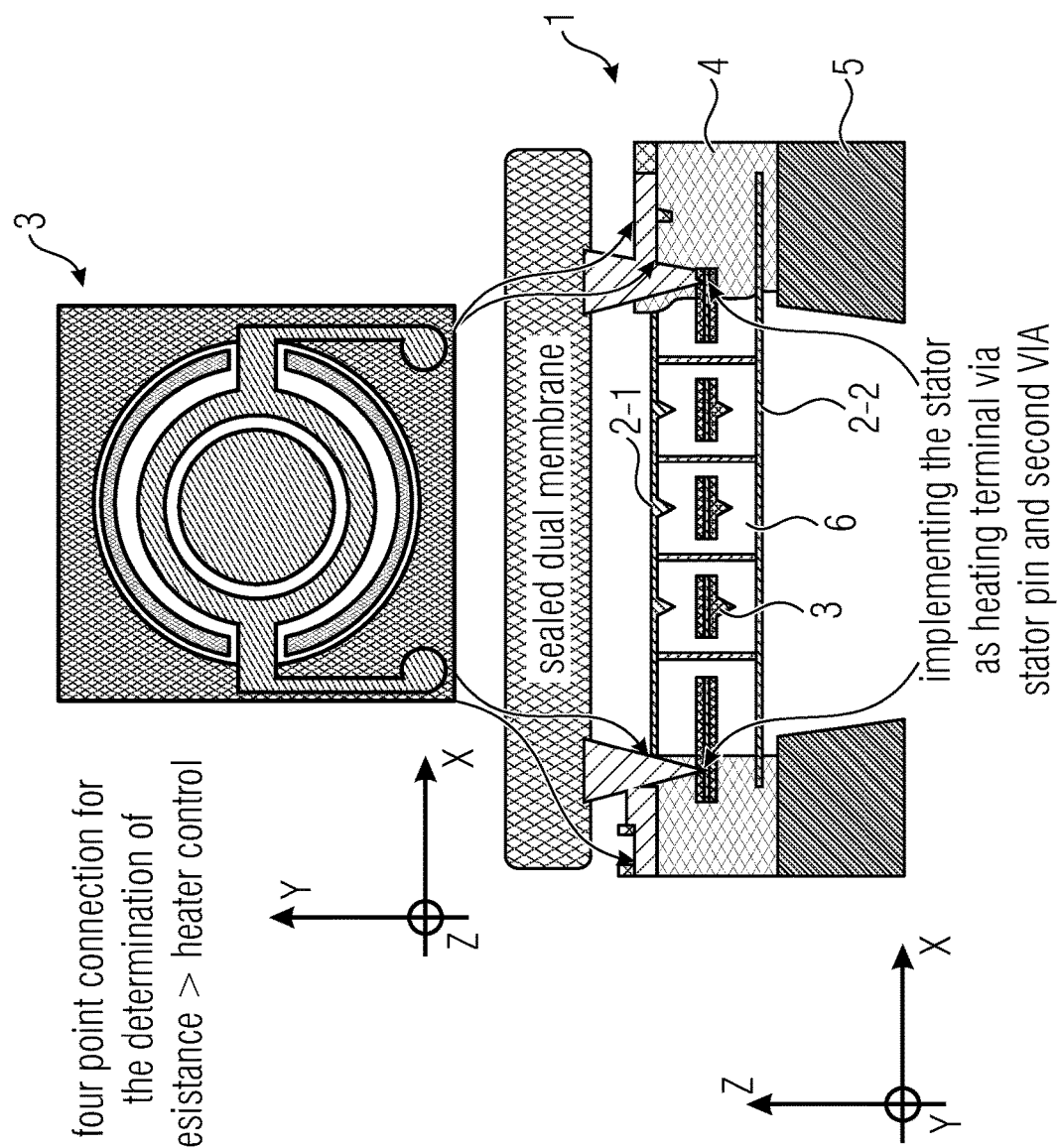
FIG. 8 shows a schematic view of an implementation of the radiation source structure of FIG. 7 in the radiation source device of FIG. 6.

FIG. 8 shows a schematic view of an implementation of the radiation source structure 3 of FIG. 7 in the radiation source device 1 of FIG. 6.

As shown in FIG. 8, the radiation source structure 3 of FIG. 7 can be laterally attached to the spacer structure 4 of the radiation source device 1 of FIG. 6, such that the radiation source structure 3 is arranged between the first membrane layer 2-1 and the second membrane layer 2-2. More specifically, the radiation source substrate 22 of the radiation source structure 3 can be laterally attached to the spacer structure 4, such that the radiation source membrane 20 of the radiation source structure 3 is freestanding in the chamber 6 formed by the two membrane layers 2-1 and 2-2 and the spacer structure 4.

As indicated in FIG. 8, a four point connection (or kelvin clamp) of the radiation source structure 3 can be used for resistance determination and heater control. Thereby, the stator can be implemented as heater-ring terminal via stator pin and second via. Specifically, the heater can be driven actively in a force state with the two force pins and simultaneously sensed correctly on the two sense pins.

According to an embodiment, a PAS heater can be integrated in a vacuum capable package, wherein a bottom or back side of the vacuum package can comprise a reflective layer.

According to an embodiment, a radiation source (e.g., infrared emitter) can be integrated in a vacuum capable package, wherein additionally a reflective layer can be integrated in order to improve the output/yield of thermal radiation (e.g., infrared radiation).

According to an embodiment, the radiation source can be manufactured as middle layer in a vacuum capable package. Thereby, the nitride stack (Layer Do) can be implemented as heater, such that the nitride stack can be operated by means of two vias in vacuum. Further, the cavity (e.g., obtained by means of Bosch etching) can be omitted. After etching the backside up to the SiOX a gold layer can be spattered there as reflector (cf. FIGS. 4 and 5).

According to an embodiment, the radiation source device allows for smaller dimensions.

According to an embodiment, the radiation source device does not require an additional package.

According to an embodiment, the radiation source device solves the thermal issues by means of the vacuum.

According to an embodiment, the radiation source device provides an improved thermal radiation (e.g., infrared radiation) output/yield due to the reflector.

According to an embodiment, the radiation source device allows reducing packaging costs.

According to an embodiment, the radiation source device provides in improved performance.

According to an embodiment, the radiation source device provides an improved stability and life period.

Figure 9:
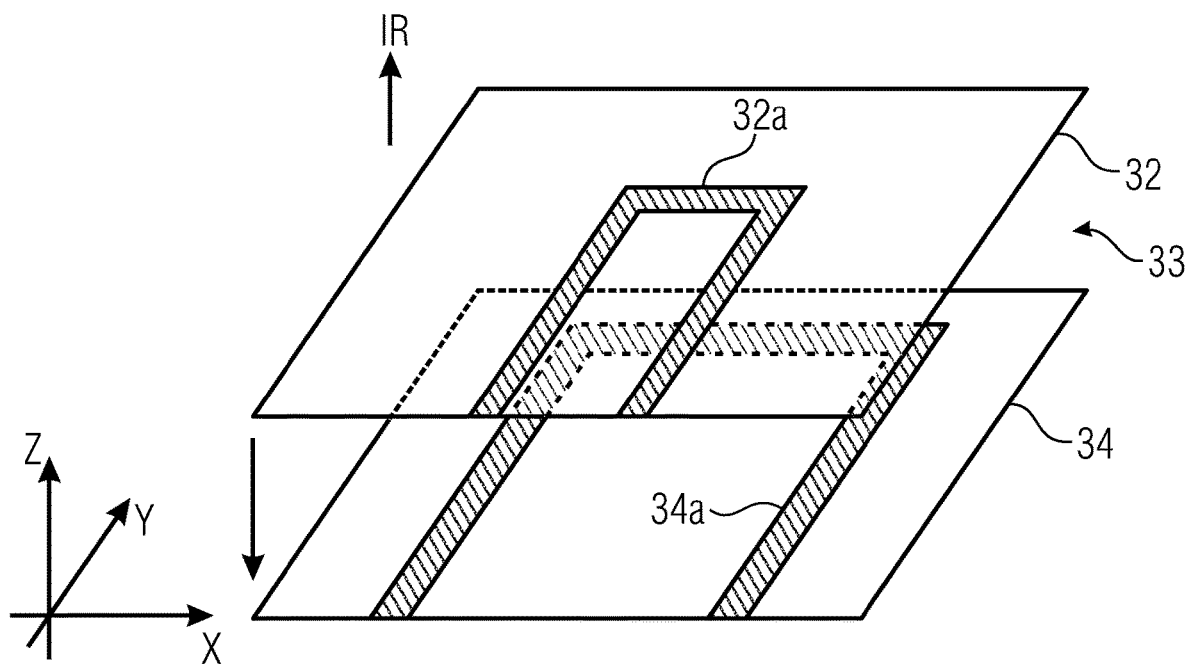
FIG. 9 shows a schematic three-dimensional view of another exemplary radiation source structure.

FIG. 9 shows a schematic three-dimensional view of another exemplary radiation source structure (e.g., thermal emitter structure) 3. As indicated in FIG. 9, the heating energy is emitted, for example, in the direction of the arrow IR. The radiation source structure 3 illustrated here is illustrated schematically as a three dimensional representation without additional elements such as the radiation source substrate in which the membrane arrangement is introduced. The radiation source structure 3 comprises a membrane arrangement, such as a membrane stack, for example, which is formed by the two radiation source membranes (e.g., thermal emitter membranes) 32 and 34 (e.g., first radiation source membrane 32 and second radiation source membrane 34). These membranes 32 and 34 are arranged parallel/substantially parallel and in an overlapping fashion with respect to one another, i.e. at least partly overlapping or preferably even congruent. It should be noted at this juncture that even if the membranes 32 and 34 are illustrated with a quadrilateral shape, they can, of course, also have a round shape or some other freeform shape. Both membranes 32 and 34 are spaced apart from one another, such that an interspace 33 is formed therebetween, which interspace can be filled, e.g., with an electrically insulating material.

Each of the membranes 32 and 34 comprises a heating element in the form of a heating path 32a and 34a, respectively. The first heating path 32a associated with the first membrane 32 extends along an arbitrary shape, such as e.g. the U-shape illustrated here or along a meander shape on or in the associated first membrane 32. Analogously thereto, the second heating path 34a likewise extends along the surface of the associated membrane 34 with an arbitrary shape. Both heating paths 32a and 34a are shaped from a lateral standpoint such that they are arranged in a non-overlapping fashion.

Each of the heating paths 32a and 34a is conductive (e.g., metallized or doped) and emits a dedicated temperature profile upon excitation with a voltage (e.g., DC or AC), said temperature profile in principle following the shape of the conductors 32a and 34a. By virtue of the fact that, rather than one plane, a plurality of planes with individual heating paths 32a and 34a are provided and said heating paths also lie in a manner spatially offset with respect to one another, at the emission surface of the radiation source structure 3, e.g., at the surface of the membrane 32, upon emission in the direction IR, a homogenous temperature distribution is achieved as a result of superimposition of the individual temperature distributions.

Figure 10:
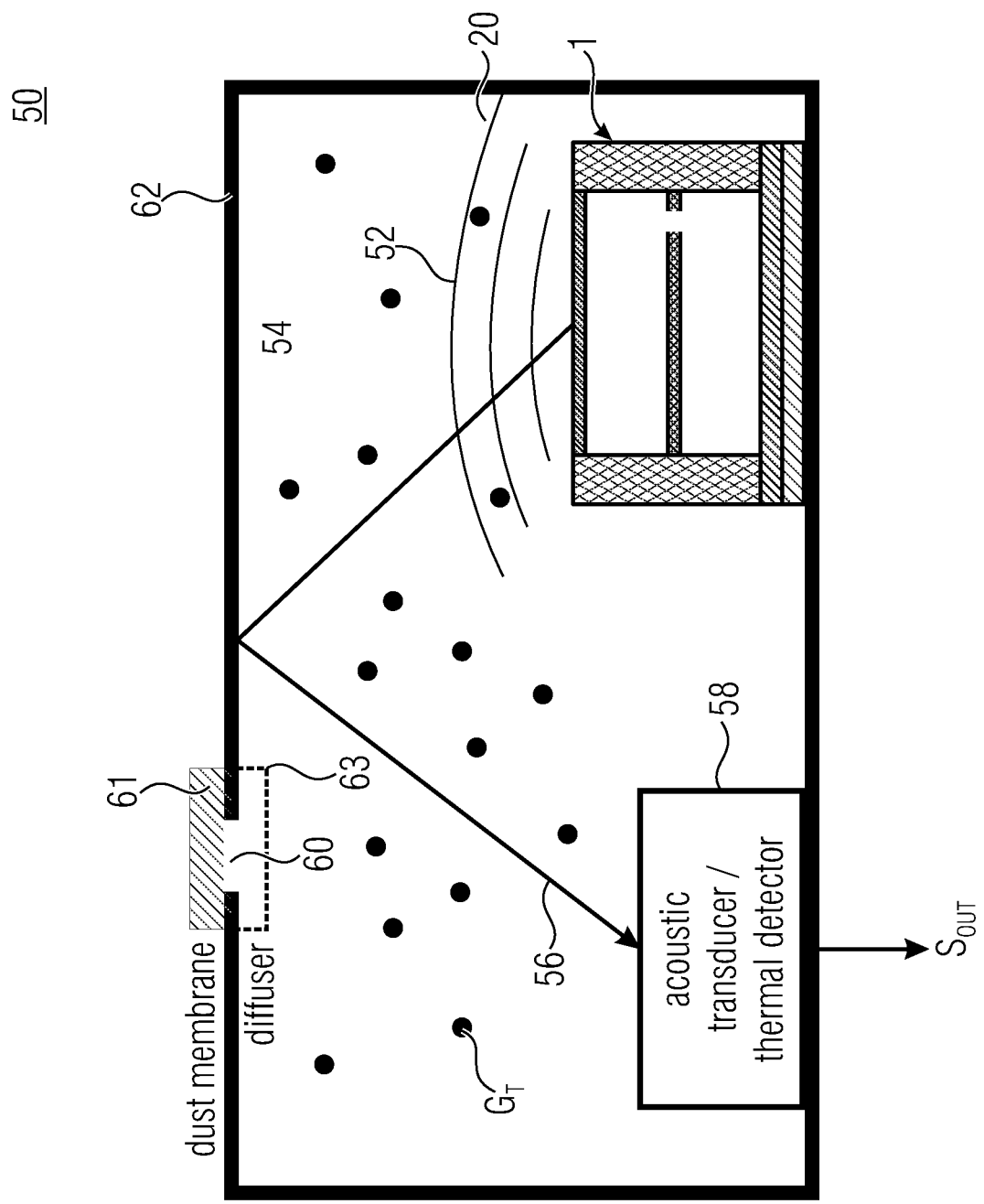
FIG. 10 shows a schematic cross-sectional view of a MEMS gas or fluid sensor according to an embodiment.

FIG. 10 shows a schematic cross-sectional view of a MEMS gas sensor 50 according to an embodiment. The above evaluations, which relate to the radiation source 1, are equally applicable to the radiation source (=radiation source) 1 of FIG. 10. In the present context, embodiments may relate to the detection and sensing of a gas or a gas component, which may be present in an environmental atmosphere, for example.

According to an embodiment, the MEMS gas sensor 50 may be arranged as a PAS sensor (PAS=photoacoustic spectroscopy), wherein the PAS sensor may comprise the radiation source 1 for emitting electromagnetic or infrared radiation (e.g., thermal radiation) 52 and may comprise a measurement volume 54 having a target gas $G_T$ and providing an optical interaction path 56 for the emitted electromagnetic or infrared radiation 52, and may comprise an acoustic transducer/thermal detector 58 for providing a detector output signal $S_{OUT}$ based on the optical interaction of the emitted electromagnetic or infrared radiation 52 with the target gas $G_T$ in the measurement volume 54. As shown in FIG. 10, the radiation source 1 and the acoustic transducer 58 are arranged inside a mutual measurement volume (=cavity) 54.

The cavity 54 is arranged for providing an optical interaction path 56 for an interaction of the electromagnetic or infrared radiation 52 having a center wavelength λ0 with a target gas $G_T$ in the cavity 54, wherein the cavity 54 is accessible, e.g. through at least one access opening 60 in a housing 62, for an environmental gas comprising the target gas component. As shown by way of example in FIG. 10, the opening 60 may be covered by a protection membrane 61, such as a dust membrane, particle membrane, molecular filter, acoustic permeable membrane. Further, the gas sensor 50 might comprise a diffuser 63 for the environmental gas.

The gas sensor 50 may be formed as a MEMS gas sensor (MEMS=micro-electromechanical system) in a PAS configuration. The cavity 54 may be formed as a waveguide or a reflecting housing, wherein reflective coatings such as metal layers on shaped structural housing walls (=cavity walls) may guide the emitted radiation thorough the interaction path by means of reflections. As shown in FIG. 10, the cavity 54 is formed by the housing 62.

The particular wavelength of the emitted radiation 52 may be set to the respective gas or gas composition to be detected, i.e. the so-called analytic or target gas $G_T$. The emitter structure 1 may be configured to intermittently or periodically emit the electromagnetic or infrared radiation 52. Accordingly, the environmental gas inside the measurement cavity 54, including the target gas, absorbs the intermittently emitted electromagnetic or infrared radiation and, in consequence, the gases intermittently or periodically heats up and cools down in reaction to the emitted electromagnetic or infrared radiation. The absorption and related heating and cooling of the gas inside the measurement cavity 54 may produce an alternating increase and decrease of pressure inside the cavity 54. These pressure variations may be detected by the acoustic transducer 58, for example a MEMS microphone. The amount of absorption of the emitted electromagnetic or infrared radiation by the gases and the related pressure variations inside the cavity 54 may depend on the sort of gas inside the cavity 54 and it may vary with the respective target gas $G_T$ and its concentration. Each target gas $G_T$ may comprise a characteristic absorption spectrum, i.e. it may cause characteristic pressure variations in response to the emitted electromagnetic or infrared radiation 52. Said characteristic absorption spectrum may also be referred to as a gas-specific fingerprint. Accordingly, the acoustic transducer 58 may record a signal that may be characteristic for the respective target gas $G_T$, such that the acoustic transducer 58 may thereby detect and identify the respective target gas $G_T$.

Additional embodiments and aspects are described, which may be used alone or in combination with the features and functionalities described herein.

According to an embodiment, a PAS heater can be integrated in a vacuum capable package, wherein a bottom or back side of the vacuum capable package can comprise a glass wafer having a reflective layer.

According to an embodiment, the bottom layer (e.g., of the radiation source device) can be implemented as glass layer for integrating a gold reflector.

According to an embodiment, the radiation source structure (e.g., infrared emitter) can be integrated in a vacuum capable package. Thereby, glass can be chosen as carrier material, in order to coat same by thermal evaporation for manufacturing a reflection layer.

According to an embodiment, the radiation source device described herein provides an improved infrared radiation and/or an increase of performance.

According to an embodiment, the radiation source device described herein can be implemented in a CO2 gas sensor.

Subsequently, further embodiments are described, which can be implemented by themselves or in combination with the above described embodiments.

According to an embodiment, a radiation source device comprises at least one membrane layer, a radiation source structure configured to emit electromagnetic or thermal radiation, a substrate and a spacer structure, wherein the substrate, the at least one membrane layer and the spacer structure form a chamber, wherein a pressure in the chamber is lower than or equal to a pressure outside of the chamber, wherein the radiation source structure is arranged between the at least one membrane layer and the substrate.

According to an embodiment, the substrate comprises a semiconductor layer and an oxide layer arranged on the semiconductor layer.

According to an embodiment, the substrate comprises a reflector layer, wherein the semiconductor layer is arranged on the reflector layer.

According to an embodiment, the substrate comprises a glass layer and a reflector layer.

According to an embodiment, the radiation source device further comprises an optical filter layer arranged on the membrane layer.

According to an embodiment, the optical filter layer is an optical wavelength selective filter.

For example, the optical wavelength selective filter can be adapted to select the (IR, visual, etc.) wavelength range for the desired application (e.g., CO2, or any other gas of interest).

According to an embodiment, the radiation source structure is freestanding in the chamber and laterally supported by the spacer structure.

According to an embodiment, the spacer structure comprises an electrically non-conductive material.

For example, the spacer structure can comprise or consist of at least one out of silicon-oxide, silicon-nitride, glass and ceramic.

For example, the spacer structure/chamber formed by substrate, the at least one membrane layer and the spacer structure is gas-tight.

According to an embodiment, the electromagnetic or infrared radiation is thermal radiation.

According to an embodiment, the membrane layer is at least partially permeable for electromagnetic radiation.

According to an embodiment, the pressure in the chamber is less than 300 mbar.

According to an embodiment, the radiation source device comprises a perforation forming a ventilation hole between a first volume portion of the chamber enclosed between the radiation source structure and the membrane layer and a second volume portion of the chamber enclosed between the radiation source structure and the substrate.

According to an embodiment, the radiation source structure comprises a freestanding radiation source membrane supported by a radiation source substrate, wherein the radiation source substrate is attached to the spacer structure.

For example, the freestanding radiation source membrane comprises in a lateral extension a center section, an electrically conductive intermediate section and a border section (and a layer or structure adapted to optimize the optical emissivity), wherein the conductive intermediate section laterally surrounds the center section and is electrically isolated from the center section, the conductive intermediate section comprising a conductive semiconductor material that is encapsulated in an insulating material, and wherein the border section at least partially surrounds the intermediate section and is electrically isolated from the conductive intermediate section, wherein a perforation is formed through the border section, wherein the heating section at least partially is thermally isolated from the radiation section.

According to an embodiment, the radiation source structure comprises a radiation source substrate, at least one radiation source membrane, a first heating path and a second heating path, wherein the at least one radiation source membrane, the first heating path and the second heating path are arranged in different planes of the radiation source substrate.

According to an embodiment, a gas sensor, comprises a radiation source device for emitting electromagnetic or infrared radiation; a measurement volume having a target gas and providing an optical interaction path for the electromagnetic or infrared radiation emitted by the radiation source device; and an acoustic transducer or a direct thermal detector for providing a detector output signal based on the optical interaction of the emitted electromagnetic or infrared radiation with the target gas in the measurement volume. Thereby, the radiation source device comprises at least one membrane layer, a radiation source structure configured to emit electromagnetic or infrared radiation, a substrate and a spacer structure, wherein the substrate, the spacer structure and the at least one membrane layer form a chamber, wherein a pressure in the chamber is lower than or equal to a pressure outside of the chamber, wherein the radiation source structure is arranged between the at least one membrane layer and the substrate.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A gas sensor, comprising:
a radiation source device comprising:
   a first membrane layer;
   a radiation source structure configured to emit electromagnetic or infrared radiation;
   a spacer structure attached to the radiation source structure; and
   a second membrane layer;
   wherein the first membrane layer and the second membrane layer are at least partially permeable for electromagnetic radiation,
   wherein the first membrane layer, the spacer structure, and the second membrane layer form a chamber enclosing the radiation source structure, wherein a pressure in the chamber is lower than or equal to a pressure outside of the chamber,
   wherein the radiation source structure is arranged between the first membrane layer and the second membrane layer, and
   wherein the radiation source structure comprises a perforation forming a ventilation hole between a first volume portion of the chamber enclosed between the radiation source structure and the first membrane layer and a second volume portion of the chamber enclosed between the radiation source structure and the second membrane layer;
a measurement volume having a target gas and providing an optical interaction for the electromagnetic or infrared radiation emitted by the radiation source device; and
an acoustic transducer or a direct thermal detector for providing a detector output signal based on the optical interaction with the target gas in the measurement volume.

2. The gas sensor according to claim 1, further comprising:
a substrate, wherein the substrate comprises a semiconductor layer and an oxide layer arranged on the semiconductor layer.

3. The gas sensor according to claim 2, wherein the spacer structure is located on the substrate.

4. The gas sensor according to claim 3, wherein the substrate comprises an opening in an area adjacent to the second membrane layer.

5. The gas sensor according to claim 1, wherein the spacer structure comprises an electrically non-conductive material.

6. The gas sensor according to claim 1, wherein the radiation source structure is laterally supported by the spacer structure.

7. The gas sensor according to claim 1, wherein the electromagnetic or infrared radiation is thermal radiation.

8. The gas sensor according to claim 1, wherein the pressure in the chamber is less than 300 mbar.

9. A gas sensor, comprising:
a radiation source device comprising:
   a first membrane layer;
   a radiation source structure configured to emit electromagnetic or infrared radiation;
   a spacer structure; and
   a second membrane layer,
wherein the first membrane layer and the second membrane layer are at least partially permeable for electromagnetic radiation,
   wherein the first membrane layer, the spacer structure, and the second membrane layer form a chamber enclosing the radiation source structure, wherein a pressure in the chamber is lower than or equal to a pressure outside of the chamber,
   wherein the radiation source structure is arranged between the first membrane layer and the second membrane layer, and
   wherein the radiation source structure comprises a perforation forming a ventilation hole between a first volume portion of the chamber enclosed between the radiation source structure and the first membrane layer and a second volume portion of the chamber enclosed between the radiation source structure and the second membrane layer;
a measurement volume having a target gas and providing an optical interaction for the electromagnetic or infrared radiation emitted by the radiation source device; and
an acoustic transducer or a direct thermal detector for providing a detector output signal based on the optical interaction with the target gas in the measurement volume.

10. The gas sensor of claim 9, further comprising:
a substrate, wherein the substrate comprises a semiconductor layer and an oxide layer arranged on the semiconductor layer.

11. The gas sensor of claim 10, wherein the spacer structure is located on the substrate.

12. The gas sensor of claim 11, wherein the substrate comprises an opening in an area adjacent to the second membrane layer.

13. The gas sensor of claim 9, wherein the spacer structure comprises an electrically non-conductive material.

14. The gas sensor of claim 9, wherein the radiation source structure is laterally supported by the spacer structure.

15. The gas sensor of claim 9, wherein the pressure in the chamber is less than 300 mbar.

16. A method of operating a gas sensor, comprising: a radiation source device comprising: a first membrane layer, a radiation source structure configured to emit electromagnetic or infrared radiation, a spacer structure, and a second membrane layer, wherein the first membrane layer and the second membrane layer are at least partially permeable for electromagnetic radiation, wherein the first membrane layer, the spacer structure, and the second membrane layer form a chamber enclosing the radiation source structure, wherein a pressure in the chamber is lower than or equal to a pressure outside of the chamber, wherein the radiation source structure is arranged between the first membrane layer and the second membrane layer, and wherein the radiation source structure comprises a perforation forming a ventilation hole between a first volume portion of the chamber enclosed between the radiation source structure and the first membrane layer and a second volume portion of the chamber enclosed between the radiation source structure and the second membrane layer; a measurement volume having a target gas and providing an optical interaction for the electromagnetic or infrared radiation emitted by the radiation source device; and an acoustic transducer or a direct thermal detector for providing a detector output signal based on the optical interaction with the target gas in the measurement volume, the method comprising:
   emitting, by the radiation source structure, the electromagnetic or infrared radiation.

17. The method of claim 16, further comprising providing, by the acoustic transducer or the direct thermal detector, the detector output signal based on the optical interaction with the target gas in the measurement volume.

18. The method of claim 16, wherein the gas sensor further comprises a substrate, wherein the substrate comprises a semiconductor layer and an oxide layer arranged on the semiconductor layer.

19. The method of claim 18, wherein the spacer structure is located on the substrate.

20. The method of claim 16, wherein the pressure in the chamber is less than 300 mbar.

* * * * *